(12) United States Patent
Nakazato et al.

(10) Patent No.: US 12,326,343 B2
(45) Date of Patent: Jun. 10, 2025

(54) DYNAMIC CHANGING OF NAVIGATION BASED ON USER'S PREDICTED FUTURE TRAFFIC DEMAND

(71) Applicant: RAKUTEN MOBILE, INC., Tokyo (JP)

(72) Inventors: Jin Nakazato, Tokyo (JP); Saki Tanaka, Tokyo (JP); Haruka Horiuchi, Tokyo (JP)

(73) Assignee: RAKUTEN MOBILE, INC., Tokyo (JP)

( * ) Notice: Subject to any disclaimer, the term of this patent is extended or adjusted under 35 U.S.C. 154(b) by 0 days.

(21) Appl. No.: 18/021,094

(22) PCT Filed: May 31, 2022

(86) PCT No.: PCT/JP2022/022174
§ 371 (c)(1),
(2) Date: Feb. 13, 2023

(87) PCT Pub. No.: WO2023/233535
PCT Pub. Date: Dec. 7, 2023

(65) Prior Publication Data
US 2024/0263959 A1    Aug. 8, 2024

(51) Int. Cl.
*G01C 21/36* (2006.01)
*H04L 41/147* (2022.01)
*H04W 52/02* (2009.01)

(52) U.S. Cl.
CPC ........ *G01C 21/3691* (2013.01); *H04L 41/147* (2013.01); *H04W 52/0206* (2013.01)

(58) Field of Classification Search
CPC ... G01C 21/3691; G01C 21/26; H04L 41/147; H04W 52/0206; G08G 1/01; G08G 1/09
See application file for complete search history.

(56) References Cited

U.S. PATENT DOCUMENTS

| 2011/0194493 A1* | 8/2011 | Centonza .......... H04W 52/0235 370/328 |
| 2013/0332297 A1 | 12/2013 | Forutanpour et al. |

(Continued)

FOREIGN PATENT DOCUMENTS

| JP | 5-199167 A | 8/1993 |
| JP | 2003174456 A * | 6/2003 |

(Continued)

OTHER PUBLICATIONS

Original and translation of JP2003174456 (Year: 2003).*
Original and translation of JP6052638 (Year: 2016).*
U.S. Appl. No. 18/020,661, filed Feb. 10, 2023.

*Primary Examiner* — Michael D Lang
(74) *Attorney, Agent, or Firm* — Sughrue Mion, PLLC

(57) ABSTRACT

A network controller comprising one or more processors and memories in order to make it possible to achieve both continuous operation of a route search system and energy consumption reduction or leveling used resources. The one or more memories store one or more programs. The one or more processors, by reading the one or more programs, realize a user terminal traffic information acquirer, a traffic demand predictor, a route information acquirer, a route determiner, an operating state information acquirer, and an activation request generator. A navigation route is determined from one or more route candidates based on traffic demand prediction information predicting future traffic demand based on user terminal traffic information. Each base station in an off state corresponding to each area on the determined navigation route is activated.

4 Claims, 8 Drawing Sheets

(56) References Cited

U.S. PATENT DOCUMENTS

| | | |
|---|---|---|
| 2015/0063184 A1 | 3/2015 | Toda |
| 2018/0279342 A1 | 9/2018 | Takiguchi et al. |
| 2019/0188743 A1* | 6/2019 | Phillips .............. G06Q 30/0205 |
| 2020/0221349 A1 | 7/2020 | Nakata |
| 2021/0083761 A1 | 3/2021 | Hong |
| 2022/0053607 A1 | 2/2022 | Rice et al. |
| 2022/0286957 A1 | 9/2022 | Berliner et al. |
| 2022/0345978 A1* | 10/2022 | Shimizu .............. H04W 40/246 |
| 2024/0053160 A1* | 2/2024 | Andrae .............. G01C 21/3484 |
| 2024/0057122 A1 | 2/2024 | Lee et al. |

FOREIGN PATENT DOCUMENTS

| | | |
|---|---|---|
| JP | 2005-12633 A | 1/2005 |
| JP | 2006-98147 A | 4/2006 |
| JP | 2009-188883 A | 8/2009 |
| JP | 2011-91748 A | 5/2011 |
| JP | 2012-205035 A | 10/2012 |
| JP | 2015-50710 A1 | 3/2015 |
| JP | 5789462 B2 | 10/2015 |
| JP | 6052638 B2 * | 12/2016 |
| JP | 2019-68411 A | 4/2019 |
| JP | 2020-136788 A | 8/2020 |
| WO | 2017/130800 A1 | 8/2017 |

\* cited by examiner

DYNAMIC CHANGING OF NAVIGATION BASED ON USER'S PREDICTED FUTURE TRAFFIC DEMAND

CROSS REFERENCE TO RELATED APPLICATIONS

This application is a National Stage of International Application No. PCT/JP2022/022174, filed May 31, 2022.

TECHNICAL FIELD

The present disclosure relates to the dynamic changing of navigation based on a user's future traffic demand.

BACKGROUND

Generally, a route search system (navigation system) such as a car navigation system provides a navigation route based on the input of a starting point and a goal point on a user terminal.

This navigation route can be configured to take into consideration traffic congestion conditions, time required, toll roads, the user's intentions, and the like.

It is believed that the use of route search systems will increase further in the future due to the development of high-speed, high-capacity communication networks.

However, communication between a user terminal and a base station may be difficult on routes obtained by a route search system.

If communication between the user terminal and the base station is difficult, the user terminal will not be able to continue using communication services via the base station.

For example, the route search system may not be able to provide navigation routes in real time, rendering continuous operation difficult.

Patent Document 1, which is one example of the prior art, discloses a navigation apparatus that ascertains in advance which areas on a guide route enable continuous communication with an information server to prevent a detour on the guide route when avoiding dead zones, and that efficiently acquires desired information in areas where communication is possible.

According to the navigation apparatus disclosed in Patent Document 1, it is possible to obtain radio wave state information (predicted radio wave reception strength) at each point required for communication between a mobile body and an information server, and to prevent a detour on a guide route.

CITATION LIST

Patent Literature

Patent Document 1: JP 2006-98147 A

SUMMARY OF INVENTION

Technical Problem

As the development of high-speed, high-capacity communication networks progresses, as discussed above, some base stations with low communication demand may be turned off for energy consumption reduction or leveling used resources.

However, if some base stations are turned off, the locations where communication between user terminals and base stations is difficult will spread and, as mentioned above, the continuity of communication use by users will be compromised, rendering continuous operation of route search systems and the like difficult.

The present disclosure was made in view of the above and provides technology making it possible to achieve both continuous use of communication services such as route search systems and energy consumption reduction or leveling used resources.

Solution to Problem

One aspect of the present disclosure, which solves the problem discussed above and achieves the purpose, is a network controller comprising one or more processors and memories.

The one or more memories store one or more programs.

The one or more processors, by reading the one or more programs, realize a user terminal traffic information acquirer, a traffic demand predictor, a route information acquirer, a route determiner, an operating state information acquirer, and an activation request generator.

The user terminal traffic information acquirer acquires user terminal traffic information.

The traffic demand predictor predicts, based on the user terminal traffic information, future traffic demand and generates traffic demand prediction information.

The route information acquirer acquires one or more route candidates from a starting point to a goal point.

The route determiner determines, based on the traffic demand prediction information, a navigation route from the one or more route candidates.

The operating state information acquirer acquires operating state information regarding a base station.

The activation request generator generates, based on the operating state information regarding each base station corresponding to each area through which the determined navigation route passes, a request for activating each base station in an off state corresponding to each area through which the determined navigation route passes.

Additionally, one aspect of the present disclosure is a network controller comprising one or more processors and memories.

The one or more memories store one or more programs.

The one or more processors, by reading the one or more programs, realize a user terminal traffic information acquirer, a traffic demand predictor, a route information acquirer, a recommended route generator, an operating state information acquirer, and an activation request generator.

The user terminal traffic information acquirer acquires user terminal traffic information.

The traffic demand predictor predicts, based on the user terminal traffic information, future traffic demand and generates traffic demand prediction information.

The route information acquirer acquires one or more route candidates from a starting point to a goal point.

The recommended route generator generates, based on the traffic demand prediction information, one or more recommended routes from the one or more route candidates.

The operating state information acquirer acquires operating state information regarding a base station.

The activation request generator generates, based on the operating state information regarding each base station corresponding to each area through which a navigation route determined by being selected from the one or more recommended routes passes, a request for activating each base station in an off state corresponding to each area through which the determined navigation route passes.

Additionally, in one aspect of the present disclosure, in the network controller of the above-mentioned configuration, the traffic demand predictor generates a demand prediction model by learning the user terminal traffic information and predicts future traffic demand by estimating a maximum value of the traffic volume based on the demand prediction model.

Additionally, in one aspect of the present disclosure, in the network controller of the above-mentioned configuration, the activation request generator sends, to an Element Management System (EMS), a request for sequentially activating, from the starting point to the goal point, each base station in an off state corresponding to each area through which the determined navigation route passes.

Effects of Invention

According to the present disclosure, it is possible to achieve both continuous operation of a route search system and energy consumption reduction or leveling used resources.

DESCRIPTION OF EMBODIMENTS

Herebelow, embodiments of the invention will be described with reference to the attached drawings.

However, the embodiments below are exemplary and the invention is not to be construed as being limited by the descriptions.

Embodiment 1

Figure 1:
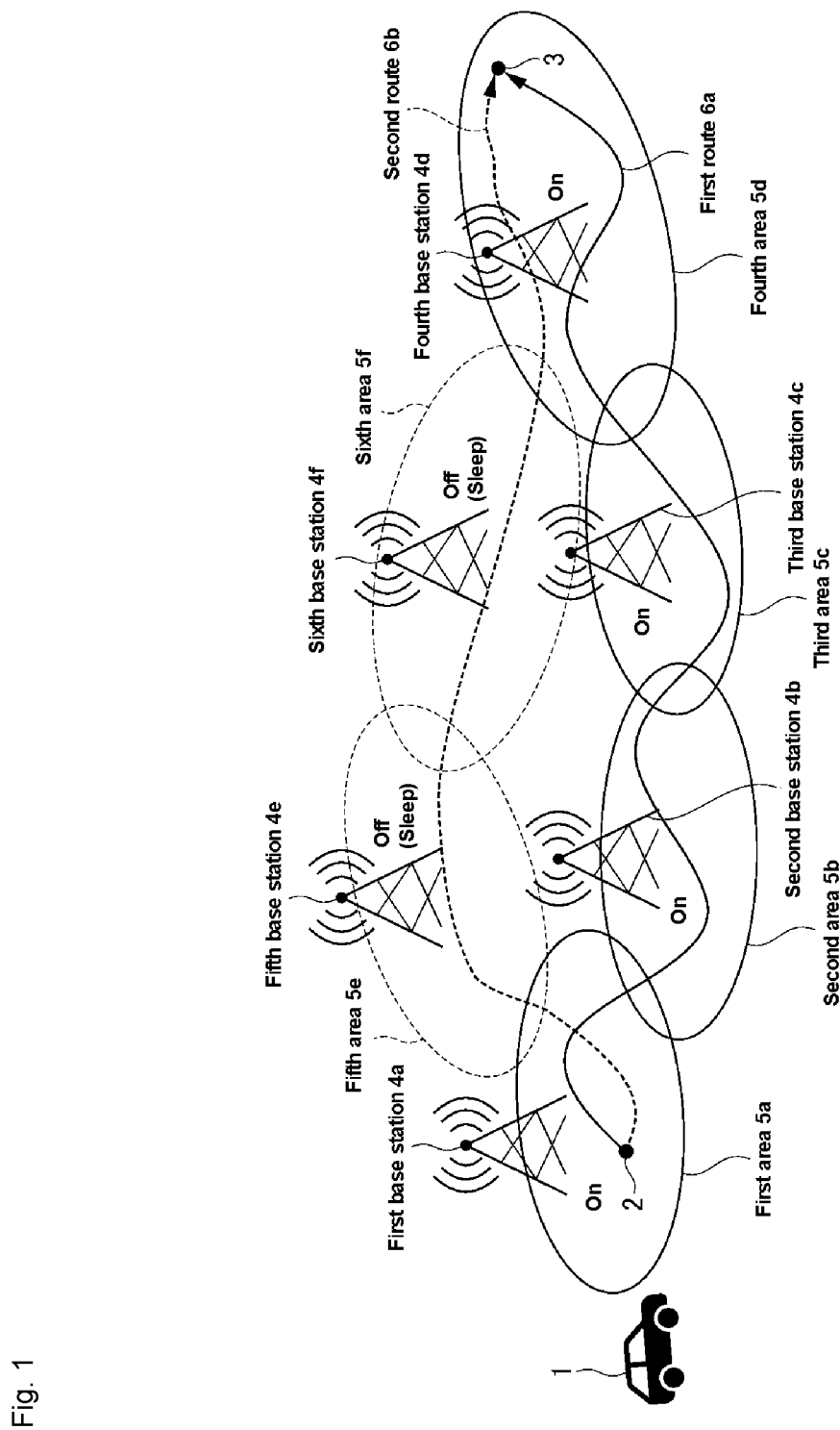
FIG. 1 is a conceptual diagram illustrating a route search to which a network controller and a navigation system comprising the network controller according to the present embodiment are applied.

FIG. 1 is a conceptual diagram illustrating a route search to which a network controller and a navigation system comprising the network controller according to the present embodiment are applied.

In FIG. 1, a vehicle in which a user terminal 1 is mounted travels from starting point 2 to goal point 3.

FIG. 1 illustrates a first base station 4a, a second base station 4b, a third base station 4c, a fourth base station 4d, a fifth base station 4e, and a sixth base station 4f.

The first base station 4a, the second base station 4b, the third base station 4c, the fourth base station 4d, the fifth base station 4e, and the sixth base station 4f are referred to as base stations 4.

Each of the base stations 4 comprises at least a Radio Unit (RU).

The RU includes an antenna for transmission/reception of radio waves.

FIG. 1 illustrates the locations of RUs as each of the base stations 4.

FIG. 1 illustrates a first area 5a, a second area 5b, a third area 5c, a fourth area 5d, a fifth area 5e, and a sixth area 5f.

The first area 5a, the second area 5b, the third area 5c, the fourth area 5d, the fifth area 5e, and the sixth area 5f are referred to as areas 5.

Each of the areas 5 is an area where transmission/reception of radio waves by the antenna included in the RU of each of the corresponding base stations 4 is possible.

Starting point 2 is present in the first area 5a and goal point 3 is present in the fourth area 5d.

FIG. 1 illustrates a first route 6a and a second route 6b, which are candidate routes that were searched for.

The first route 6a is a route that passes through the first area 5a, the second area 5b, the third area 5c, and the fourth area 5d from starting point 2 to goal point 3 in this order.

The second route 6b is a route that passes through the first area 5a, the fifth area 5e, the sixth area 5f, and the fourth area 5d from starting point 2 to goal point 3 in this order.

The case in which the user terminal (UE: User Equipment) 1 moves along the first route 6a or the second route 6b illustrated in FIG. 1 will be described.

The user terminal 1 performs radio communication with base stations 4 with which communication is possible while moving along the first route 6a or the second route 6b.

In FIG. 1, the user terminal 1 is mounted in the vehicle, and the vehicle advances from starting point 2 to goal point 3.

An example of such a user terminal 1 is a car navigation terminal.

However, the present disclosure is not limited thereto. The user terminal 1 may be a terminal that is present within the vehicle and separate from the vehicle or a terminal merely held by a user on board the vehicle.

Additionally, the user terminal 1 may be a terminal held by a user who is not on board the vehicle and moves by walking.

That is, in the present disclosure, the type and movement means of the user terminal 1 are not limited.

Each of the base stations 4 comprises at least an RU, as discussed above.

The RU is communicatively connected to a Distributed Unit (DU) (not shown).

The DU may be provided at the same location as the RU to which the DU is to be connected, such as the base stations 4 each comprising an RU, and may also be provided at a location remote from the RU to which the DU is to be connected, such as a data center.

In addition, the DU is communicatively connected to a Centralized Unit (CU) (not shown).

The CU may be provided at the same location as the DU to which the CU is to be connected, such as the base stations 4 or a data center comprising a DU, and may also be provided at a location remote from the DU to which the CU is to be connected.

That is, the base stations 4 each comprise at least an RU, and may further comprise a DU and may further comprise a CU.

DUs may be virtualized DUs (vDUs) constructed in virtualization infrastructure.

In addition, CUs may be virtualized CUs (vCUs) constructed in virtualization infrastructure.

In the following descriptions, DUs and vDUs are referred to without distinction as DUs and CUs and vCUs are referred to without distinction as CUs in principle.

RUs can be controlled by other apparatuses (not shown) and switched between an on state and an off state.

DUs can also be controlled by other apparatuses (not shown) and switched between an on state and an off state.

In cases when DUs are vDUs, DUs can be switched between an on state and an off state by adding or deleting vDUs on virtualization infrastructure.

Examples of apparatuses that can perform the switching between an on state and an off state for RUs and DUs include management apparatuses such as an Operation Support System (OSS) or an EMS in a radio network system.

In the present disclosure, the base stations 4 that can communicate with the user terminal 1 are in an on state.

In order for a base station 4 to be in an on state, the RU provided to the base station 4, the DU to which the RU connects, and the CU to which the DU connects must all be on.

In addition, in the present disclosure, base stations 4 in which at least one of an RU and a DU to which the RU connects is off are in an off state (denoted as Sleep in FIG. 1).

Among the base stations 4, those with low communication demand may be turned off for the purpose of energy consumption reduction, leveling used resources, or the like.

When a DU is a vDU, and the vDU is deleted on virtualization infrastructure, the base station 4 comprising the RU connecting to this vDU can be transitioned quickly to an off state.

As discussed above, the user terminal 1 moves while performing radio communication with each of the corresponding base stations 4 in each of the areas 5 through which the user terminal 1 passes.

In FIG. 1, the first base station 4a is in an on state.

For this reason, the user terminal 1 can use communication services by transmitting/receiving radio waves to/from the first base station 4a in the first area 5a.

The second base station 4b, the third base station 4c, and the fourth base station 4d are also in an on state similar to the first base station 4a.

The user terminal 1 can use communication services by transmitting/receiving radio waves to/from the second base station 4b in the second area 5b, by transmitting/receiving radio waves to/from the third base station 4c in the third area 5c, and by transmitting/receiving radio waves to/from the fourth base station 4d in the fourth area 5d.

Accordingly, the user terminal 1 can continuously use communication services from starting point 2 to goal point 3 on the first route 6a without interruption of radio waves.

However, in FIG. 1, the fifth base station 4e is in an off state in which the fifth base station 4e is not operating.

For this reason, even if the user terminal 1 were to be present within the fifth area 5e, the user terminal 1 would not be able to transmit/receive radio waves to/from the fifth base station 4e and would not be able to use communication services, unless the user terminal 1 transmits/receives radio waves to/from other base stations.

The sixth base station 4f is also in an off state in which the sixth base station 4f is not operating.

For this reason, even if the user terminal 1 were to be present within the sixth area 5f, the user terminal 1 would not be able to transmit/receive radio waves to/from the sixth base station 4f and would not be able to use communication services, unless the user terminal 1 transmits/receives radio waves to/from other base stations.

Accordingly, the user terminal 1 would not be able to continuously use communication services in areas that do not overlap any of the first area 5a, the second area 5b, the third area 5c, and the fourth area 5d on the second route 6b, even within the fifth area 5e and the sixth area 5f, because radio waves would be interrupted.

In this way, the continuity of communication use by a user is ensured on the first route 6a because communication between the user terminal 1 and the base stations 4 is ensured.

However, it is difficult to ensure the continuity of communication use by a user on the second route 6b because communication between the user terminal 1 and the base stations 4 may be interrupted.

In order to ensure continuity of communication use by a user on the second route 6b, the fifth base station 4e corresponding to the fifth area 5e and the sixth base station 4f corresponding to the sixth area 5f need to be transitioned from an off state to an on state.

A configuration that allows the base stations 4 to be transitioned from an off state to an on state in this way will be described below.

Figure 2:
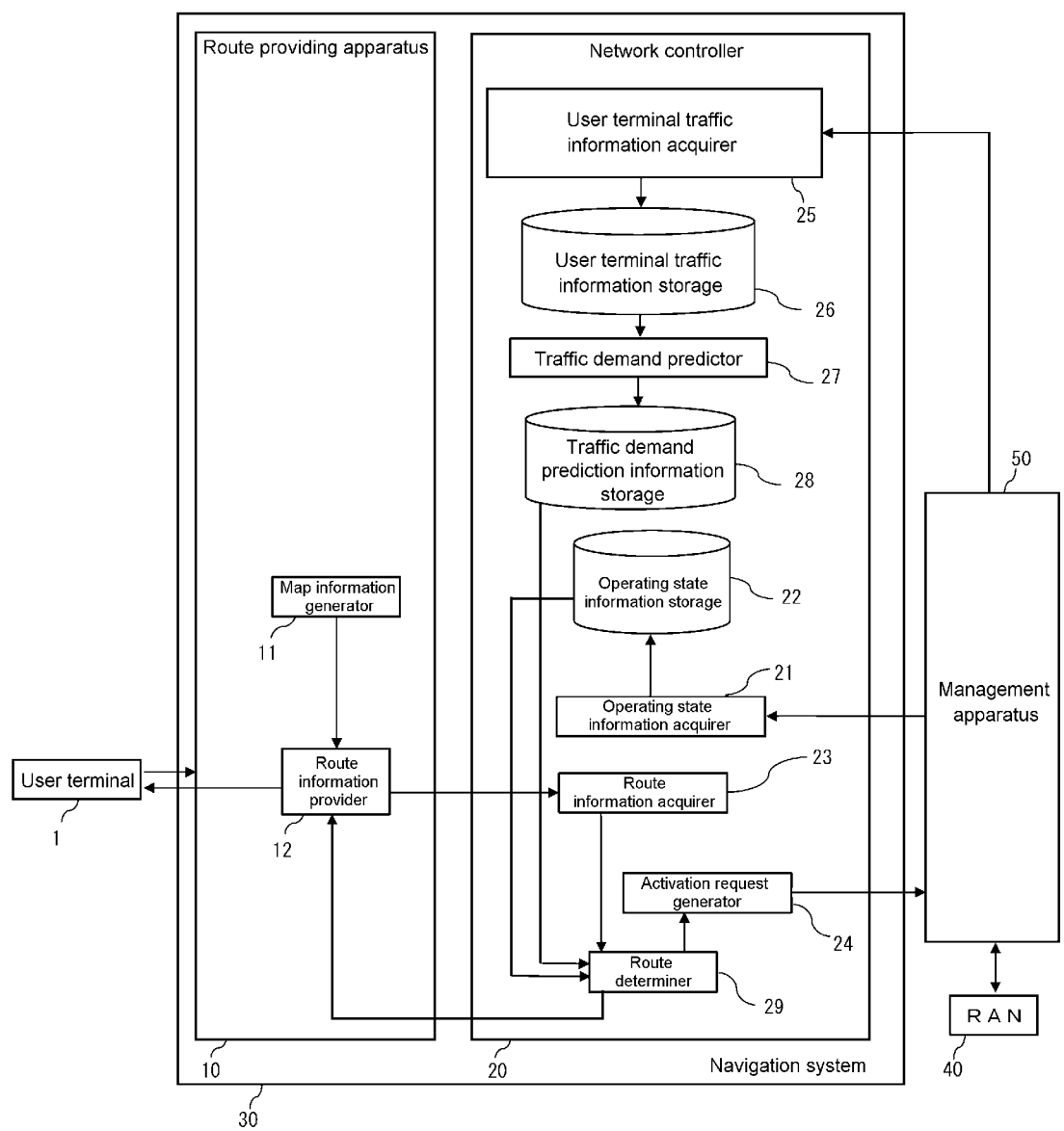
FIG. 2 is a functional block diagram illustrating the configuration of a navigation system and the surroundings thereof in Embodiment 1.

FIG. 2 is a functional block diagram illustrating the configuration of a navigation system 30 and the surroundings thereof in the present embodiment.

The navigation system 30 illustrated in FIG. 2 includes at least a route providing apparatus 10 and a network controller 20.

The navigation system 30 is connected to a management apparatus 50 connected to a Radio Access Network (RAN) 40.

The RAN 40 is a network on the side that performs radio communication with the user terminal 1 in a radio network system, and the RUs, DUs, and CUs discussed above are present in the RAN 40.

The route providing apparatus 10 acquires at least starting point information and goal point information from the user terminal 1 and provides, to the user terminal 1, one or more route candidates from a starting point to a goal point.

The starting point information is information indicating the location of a starting point.

An example of starting point information is the longitude and latitude of a starting point.

The goal point information is information indicating the location of a goal point.

An example of goal point information is the longitude and latitude of a goal point.

The route providing apparatus 10 includes a map information generator 11 and a route information provider 12.

The map information generator 11 stores map information.

The map information generator 11 generates one or more route candidates based on the map information and the starting point information and the goal point information acquired from the user terminal 1.

The generation of one or more route candidates may be performed using a known method and may be performed taking into consideration traffic congestion conditions, time required, toll roads, the user's intentions, and the like.

In the example illustrated in FIG. 1, the map information generator 11 generates the first route 6a and the second route 6b as route candidates based on the starting point information regarding starting point 2 and the goal point information regarding goal point 3.

An example of map information stored in the map information generator 11 is dynamic maps.

Dynamic maps are database-like maps in which various traffic information such as vehicle locations has been added to high-precision, three-dimensional maps.

According to dynamic maps, route candidates that take into consideration traffic congestion conditions can be generated.

The route information provider 12 provides, to the user terminal 1, a navigation route determined from one or more route candidates.

The network controller 20 comprises an operating state information acquirer 21, an operating state information storage 22, a route information acquirer 23, an activation request generator 24, a user terminal traffic information acquirer 25, a user terminal traffic information storage 26, a traffic demand predictor 27, a traffic demand prediction information storage 28, and a route determiner 29.

The network controller 20 is for example a RAN Intelligent Controller (RIC) and may be a real-time RIC.

The operating state information acquirer 21 acquires operating state information regarding each of the one or more base stations 4 within the RAN 40 from the management apparatus 50 communicatively connected to the RAN 40.

Operating state information refers to information indicating whether the base stations 4 are in an on state or an off state.

The operating state information regarding each of the base stations 4 is information indicating whether each of the base stations 4 is in an on state or an off state.

The acquisition of operating state information regarding the base stations 4 by the operating state information acquirer 21 may be performed at regular intervals by polling, Syslog, or the like.

The operating state information storage 22 stores, as a database or the like, the operating state information regarding the one or more base stations 4 within the RAN 40 that was acquired by the operating state information acquirer 21.

The route information acquirer 23 acquires, from the route providing apparatus 10, route information indicating a navigation route determined from the one or more route candidates from the starting point to the goal point.

Based on the operating state information regarding each base station 4 corresponding to each area 5 through which the determined navigation route passes, the activation request generator 24 generates, for the management apparatus 50, a request for activating the base stations 4 in order to activate all of the base stations 4 in an off state corresponding to the areas 5 through which the determined navigation route passes.

It is assumed that the request includes information regarding all of the base stations 4 that are to be activated, but in some cases, the request may not include information regarding all of the base stations 4 that are to be activated.

For example, when a rule that the fourth base station 4d is also automatically activated when the third base station 4c is activated has been provided in advance and it is desired to activate both the third base station 4c and the fourth base station 4d, the activation request generator 24 may be set to generate a request for activating the third base station 4c and not generate a request for activating the fourth base station 4d.

The activation request generator 24 may send, to the management apparatus 50, a request for sequentially activating, from starting point 2 to goal point 3, each base station 4 in a non-operating state, that is, an off state, corresponding to each area through which the determined navigation route passes.

In this way, the base stations 4 can be activated in the order in which the base stations 4 are used by the user terminal by sending a request for sequentially activating the base stations 4.

The user terminal traffic information acquirer 25 acquires user terminal traffic information regarding the user terminal 1 from the management apparatus 50.

The user terminal traffic information storage 26 stores, as a database or the like, the user terminal traffic information regarding the user terminal 1 that was acquired by the user terminal traffic information acquirer 25.

Based on the user terminal traffic information regarding the user terminal 1, the traffic demand predictor 27 predicts future traffic demand of the user terminal 1 by analyzing the behavior of the user and generates traffic demand prediction information.

Traffic demand prediction information is generated by acquiring traffic demand information regarding the current applications in the user terminal 1, generating a demand prediction model by learning the traffic demand information that was acquired, and estimating the maximum value of the traffic volume based on the demand prediction model.

In this way, by estimating the maximum value of the traffic volume based on the demand prediction model, traffic demand prediction information that takes the margin into consideration can be generated.

According to the analysis of the behavior of the user, for example, when the user terminal 1 is heading toward the destination and the frequency of use of an application that plays videos by streaming is high, the future traffic demand of the user terminal 1 is predicted to be high, and when the user terminal 1 is heading toward the destination and the frequency of use of applications other than the navigation system is low, the future traffic demand of the user terminal 1 is predicted to be low.

The traffic demand prediction information storage 28 stores traffic demand prediction information as a database or the like.

The route determiner 29 determines a navigation route from the one or more route candidates and sends route information indicating the determined navigation route to the route information provider 12 and the network controller 20.

Here, when multiple route candidates are sent from the route providing apparatus 10, the route determiner 29 determines, based on traffic demand prediction information, a navigation route from the multiple route candidates and sends the determined navigation route to the route information provider 12.

The route determiner 29 can determine a navigation route based on traffic demand predictions regarding the user terminal and/or communication conditions on each route.

As one example, when the future traffic demand of the user terminal 1 is predicted to be low, the route determiner 29 can select, from among multiple route candidates, a route with many base stations in an on state corresponding to the areas to be passed through as the navigation route.

This may result in the same navigation route being given to multiple user terminals predicted to have low future traffic demand.

However, the traffic demand of each individual user terminal is predicted to be low. Thus, even if there were multiple such user terminals, the possibility that this would lead to a shortage of communication resources on the navigation route is predicted to be low.

As another example, when the future traffic demand of the user terminal 1 is predicted to be high, the route determiner 29 can select, from among multiple route candidates, a route with few user terminals using base stations corresponding to the areas to be passed through as the navigation route.

In this case, whether each individual base station corresponding to each area to be passed through is in an on state or an off state is not taken into consideration.

This results in a navigation route with few other competing user terminals being given to user terminals predicted to have high future traffic demand.

Even if the traffic demand of a user terminal is predicted to be high, there are few competing user terminals on the navigation route. Thus, the possibility that this would lead to a shortage of communication resources on the navigation route is predicted to be low.

The route determiner 29 may be configured to switch between the two example navigation route determination methods mentioned above depending on whether the future traffic demand of the user terminal 1 is predicted be low or high.

The management apparatus 50 communicatively connects to the RAN 40 and acquires operating state information regarding each of the one or more base stations 4 within the RAN 40.

The acquisition of operating state information regarding the base stations 4 by the management apparatus 50 may be performed at regular intervals by polling, Syslog, or the like.

Here, an example of operating state information regarding the base stations 4 is operating state information regarding an RU connected to a DU.

The management apparatus 50 may acquire operating state information regarding an RU in the RAN 40 from a DU connected to the RU and use this operating state information as operating state information regarding the base station 4 comprising the RU.

The management apparatus 50 manages not only the navigation system 30 but also the configurations within the RAN 40.

An example of the management apparatus 50 is an EMS.

In addition, the management apparatus 50 acquires user terminal traffic information regarding the user terminal 1.

The acquisition of user terminal traffic information regarding the user terminal 1 by the management apparatus 50 may be performed at regular intervals.

An example of such a management apparatus 50 is Multi-access Edge Computing (MEC).

That is, the management apparatus 50 may be configured to comprise both an EMS and MEC.

As illustrated in FIG. 2, when operating state information regarding the base stations 4 within the RAN 40 is stored in the operating state information storage 22 included in the network controller 20, the navigation system 30 does not need to acquire pieces of operating state information regarding the base stations 4 one by one from the management apparatus 50 during navigation operation.

Accordingly, the navigation system 30 can quickly perform operations using operating state information regarding the base stations 4.

Figure 3:
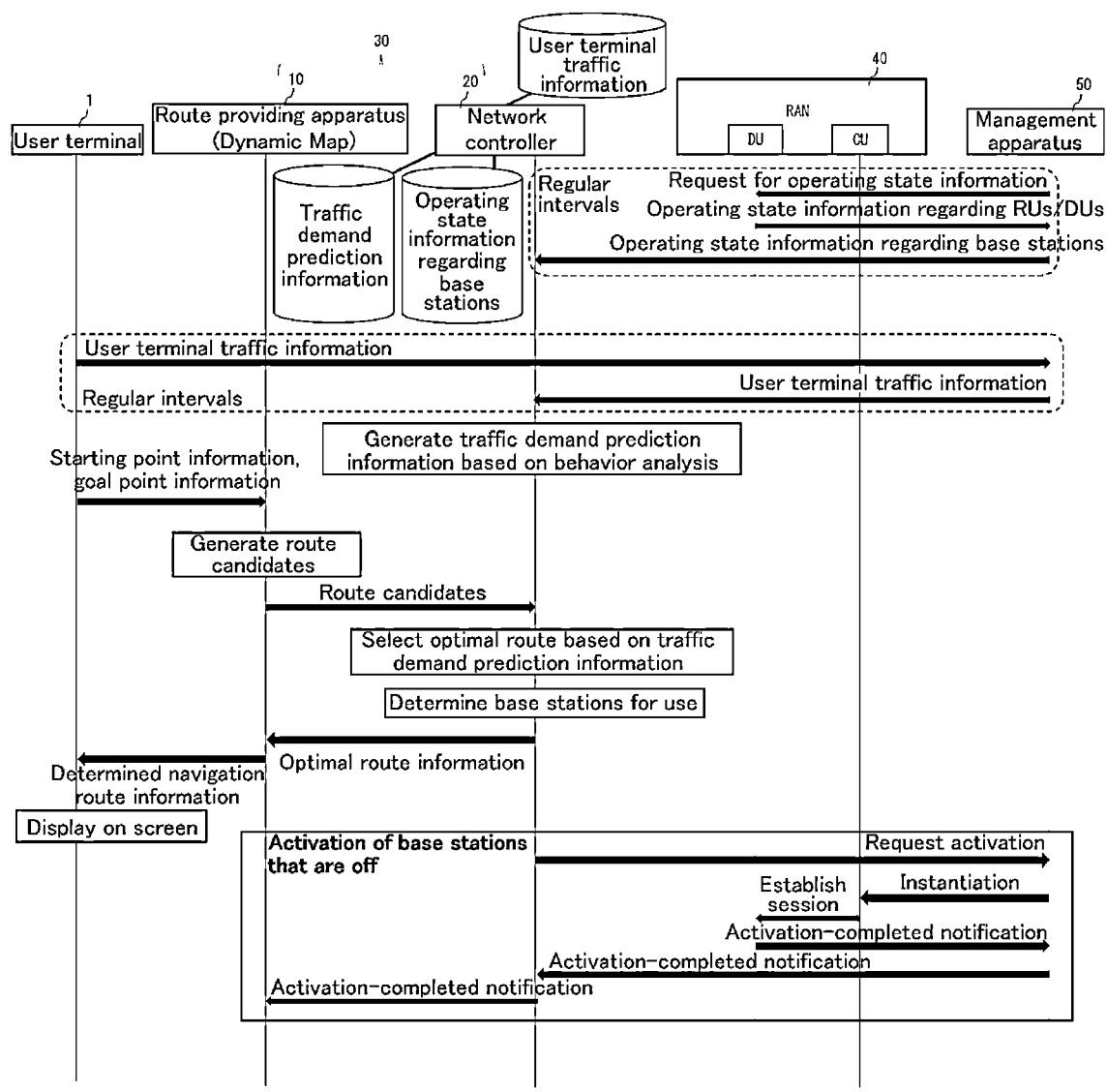
FIG. 3 is a sequence diagram describing the operation of the navigation system in Embodiment 1.

FIG. 3 is a sequence diagram describing the operation of the navigation system 30 in the present embodiment.

Here, the management apparatus 50 acquires operating state information regarding one or more base stations 4 within the RAN 40 and user terminal traffic information regarding the user terminal 1 at regular intervals.

First, the management apparatus 50 sends a request for operating state information to one or more DUs in the RAN 40.

The one or more DUs from which operating state information has been requested send, to the management apparatus 50, operating state information regarding the DUs and operating state information regarding one or more RUs connected to the DUs.

The network controller 20 acquires, at regular intervals by polling, Syslog, or the like, operating state information regarding one or more base stations 4 within the RAN 40 that was acquired by the management apparatus 50 and stores the operating state information.

The network controller 20 thereby stores the latest operating state information regarding one or more base stations 4 within the RAN 40 in the operating state information storage 22.

For this reason, during operation of the navigation system 30, the latest operating state information regarding one or more base stations 4 within the RAN 40 can be used without acquiring each piece of operating state information, one by one, from the management apparatus 50.

Accordingly, the navigation system 30 can quickly perform operations using the information.

However, the present disclosure is not limited thereto. The acquisition of operating state information regarding one or more base stations 4 within the RAN 40 by the network controller 20 and the management apparatus 50 may be performed, as appropriate, during operation of the navigation system 30 without being performed at regular intervals.

In addition, the management apparatus 50 acquires user terminal traffic information regarding the user terminal 1 at regular intervals and sends the user terminal traffic information that was acquired to the network controller 20.

The management apparatus 50 can acquire user terminal traffic information by acquiring the number of user terminals transmitting queries to a Domain Name System (DNS) server (not shown).

Additionally, the management apparatus 50 may acquire user terminal traffic information by mirroring and monitoring application routers.

Additionally, the management apparatus 50 may acquire user terminal traffic information through the response status of or the load on proxies and/or the response status of or the load on a load distribution apparatus (not shown), which is a load balancer.

The network controller 20 predicts future traffic demand of the user terminal 1 through an analysis of the user's behavior based on user terminal traffic information regarding the user terminal 1 and generates traffic demand prediction information.

The user terminal 1 sends starting point information and goal point information to the route providing apparatus 10.

Based on the starting point information and the goal point information sent from the user terminal 1 and map information, the route providing apparatus 10 searches for one or more route candidates in map information and generates one or more route candidates.

The route providing apparatus 10 sends, to the network controller 20, one or more route candidates including the starting point information and the goal point information.

The network controller 20 selects an optimal route based on the traffic demand prediction information.

In addition, based on operating state information regarding each base station corresponding to each area through which the optimal route passes, the network controller 20 searches for each base station corresponding to each area through which the optimal route passes and determines the base stations to be used by the user terminal 1.

In the following descriptions, the base stations determined to be used by the user terminal 1 are also described as "base stations for use".

Moreover, an activation request for base stations 4 that are in an off state among the determined base stations for use is sent to the management apparatus 50.

In the following descriptions, the base stations for use that are in an off state are also described as "base stations to be activated".

The route providing apparatus 10 determines a navigation route based on optimal route information and sends determined navigation route information to the user terminal 1.

The user terminal 1 displays the determined navigation route information on a screen.

However, the present disclosure is not limited thereto. When the user terminal 1 is a vehicle that performs autonomous driving control, autonomous driving control may be performed using determined navigation route information without displaying the information on a screen.

Meanwhile, activation processing is performed for base stations 4 that are in an off state among the base stations for use on the optimal route.

The network controller 20 sends, to the management apparatus 50, an activation request for base stations 4 to be activated that are in an off state among the determined base stations for use.

The management apparatus 50 instantiates DUs corresponding to the base stations 4 to be activated for which the activation request was received.

In the RAN 40, a new session is established for the RUs of the base stations 4 to be activated and the instantiated DUs and an activation-completed notification regarding the base stations 4 to be activated is sent to the management apparatus 50.

The management apparatus 50 sends, to the network controller 20, an activation-completed notification regarding the base stations 4 to be activated for which the activation request was received.

The network controller 20 sends an activation-completed notification to the route providing apparatus 10.

Figure 4:
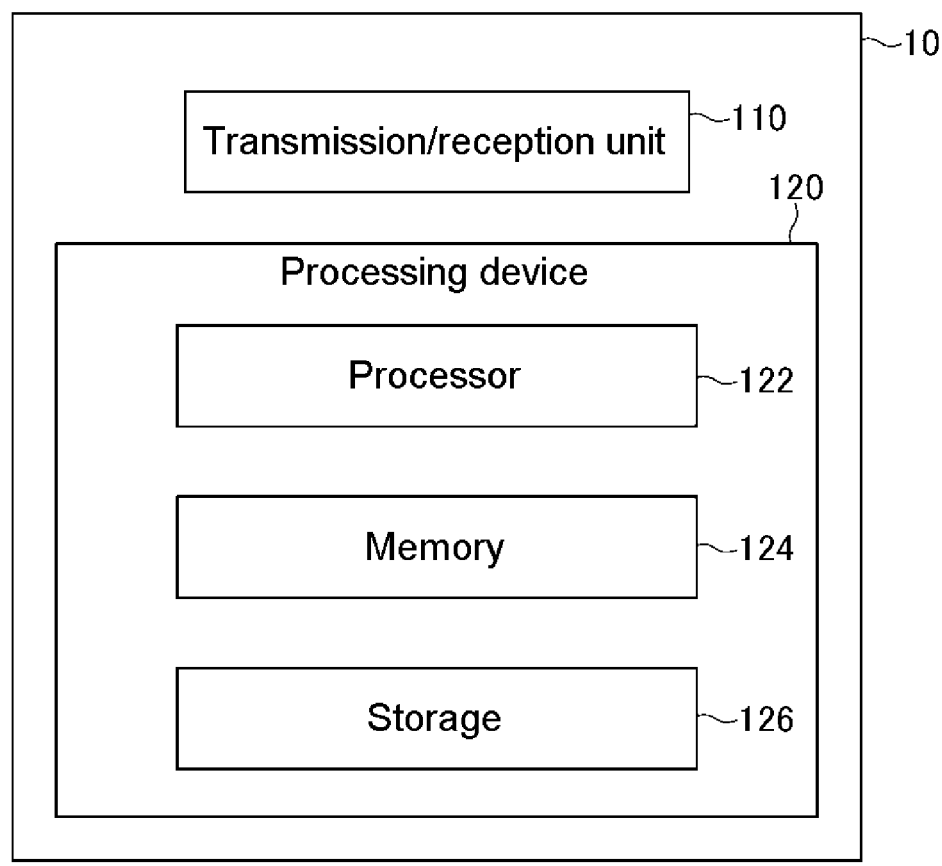
FIG. 4 is a block diagram illustrating the configuration of the route providing apparatus illustrated in FIG. 2.

FIG. 4 is a block diagram illustrating the configuration of the route providing apparatus 10 illustrated in FIG. 2.

The route providing apparatus 10 includes a transmission/reception unit 110 and a processing device 120.

The transmission/reception unit 110 performs transmission/reception of data between the user terminal 1 and the network controller 20 illustrated in FIG. 2.

The processing device 120 includes a processor 122 and a memory 124.

There are one or more processors 122 and memories 124.

The processing device 120 may further include storage 126.

The processing device 120 causes the transmission/reception unit 110 to operate and can, through the processor 122 and the memory 124, execute data processing of the route providing apparatus 10 illustrated in FIG. 2

Furthermore, the storage 126 can store map information.

An example of map information that is stored in the storage 126 is dynamic maps.

The route providing apparatus 10 may further include other configurations that are not shown.

Figure 5:
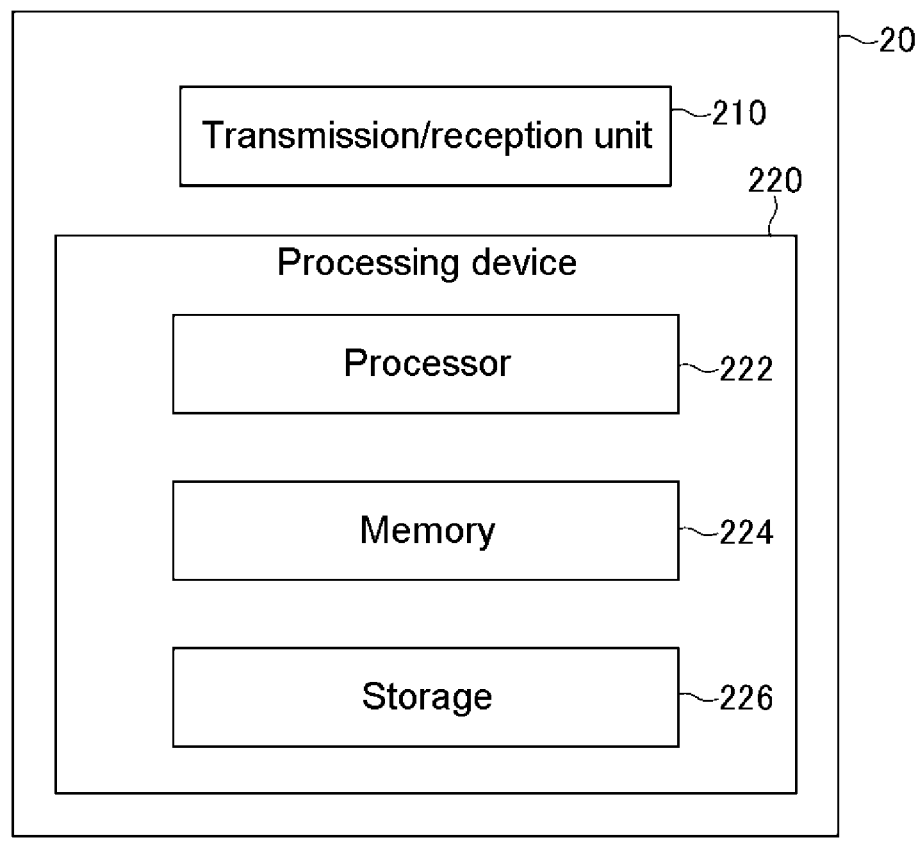
FIG. 5 is a block diagram illustrating the configuration of the network controller illustrated in FIG. 2.

FIG. 5 is a block diagram illustrating the configuration of the network controller 20 illustrated in FIG. 2.

The network controller 20 includes a transmission/reception unit 210 and a processing device 220.

The transmission/reception unit 210 performs transmission/reception of data between the route providing apparatus 10 and the management apparatus 50 illustrated in FIG. 2.

The processing device 220 includes a processor 222 and a memory 224.

There are one or more processors 222 and memories 224.

The processing device 220 may further include storage 226.

The processing device 220 causes the transmission/reception unit 210 to operate and can, through the processor 222 and the memory 224, execute data processing of the network controller 20 illustrated in FIG. 2

Furthermore, the storage 226 can store operating state information regarding the base stations 4, user terminal traffic information, and traffic demand prediction information, and can realize the operating state information storage 22, the user terminal traffic information storage 26, and the traffic demand prediction information storage 28.

The network controller 20 may further include other configurations that are not shown.

Here, the route providing apparatus 10 and the network controller 20 are described as separate apparatuses. However, the present disclosure is not limited thereto.

In the present disclosure, both the route providing apparatus 10 and the network controller 20 may be realized by one apparatus, and the route providing apparatus 10 and the network controller 20 may share at least one of a transmission/reception unit, a processor, a memory, and storage.

Figure 6:
FIG. 6 is a diagram illustrating an example of application of a navigation system in Embodiment 2.

FIG. 6 is a diagram illustrating an example of application of the navigation system 30 in the present embodiment.

FIG. 6 illustrates two route candidates from starting point 102 to goal point 103 and five areas at the start.

The two route candidates are a first route 106a and a second route 106b.

The five areas are a first area 105a, a second area 105b, a third area 105c, a fourth area 105d, and a fifth area 105e.

The first area 105a, the second area 105b, the fourth area 105d, and the fifth area 105e are areas where the corresponding base stations are in an on state.

For this reason, wireless communication is possible for a user terminal present within the first area 105a, the second area 105b, the fourth area 105d, and the fifth area 105e.

Meanwhile, in the third area 105c, the corresponding base station is in an off state at the start.

For this reason, a user terminal present within the third area 105c would not be able to perform wireless communication in the starting state unless the user terminal communicates with other base stations.

The first route 106a is a route that passes through the first area 105a, the second area 105b, the fifth area 105e, and the fourth area 105d from starting point 102 to goal point 103 in this order.

Accordingly, when the determined navigation route is the first route 106a, the user terminal can reach goal point 103 from starting point 102 while continuing wireless communication with the base stations without transitioning the base station in an off state to an on state.

The second route 106b is a route that passes through the first area 105a, the second area 105b, the third area 105c, and the fourth area 105d from starting point 102 to goal point 103 in this order.

Accordingly, when the determined navigation route is the second route 106b, the base station corresponding to the third area 105c is transitioned to an on state, as mentioned above, and the user terminal can reach goal point 103 from starting point 102 while continuing wireless communication with the base stations.

As described above, according to the present embodiment, base stations in an off state that are to perform communication with a user terminal are activated based on the navigation route provided by the route providing apparatus 10, even when base stations with low communication demand are turned off for energy consumption reduction and leveling used resources.

This can enable continuous use of communication services such as route search systems.

Accordingly, it is possible to achieve both continuous use of communication services such as route search systems and energy consumption reduction or leveling used resources.

Embodiment 2

In Embodiment 1, an example in which the network controller 20 determines a navigation route was described. However, the present disclosure is not limited thereto. The navigation route may be determined in the user terminal 1.

Figure 7:
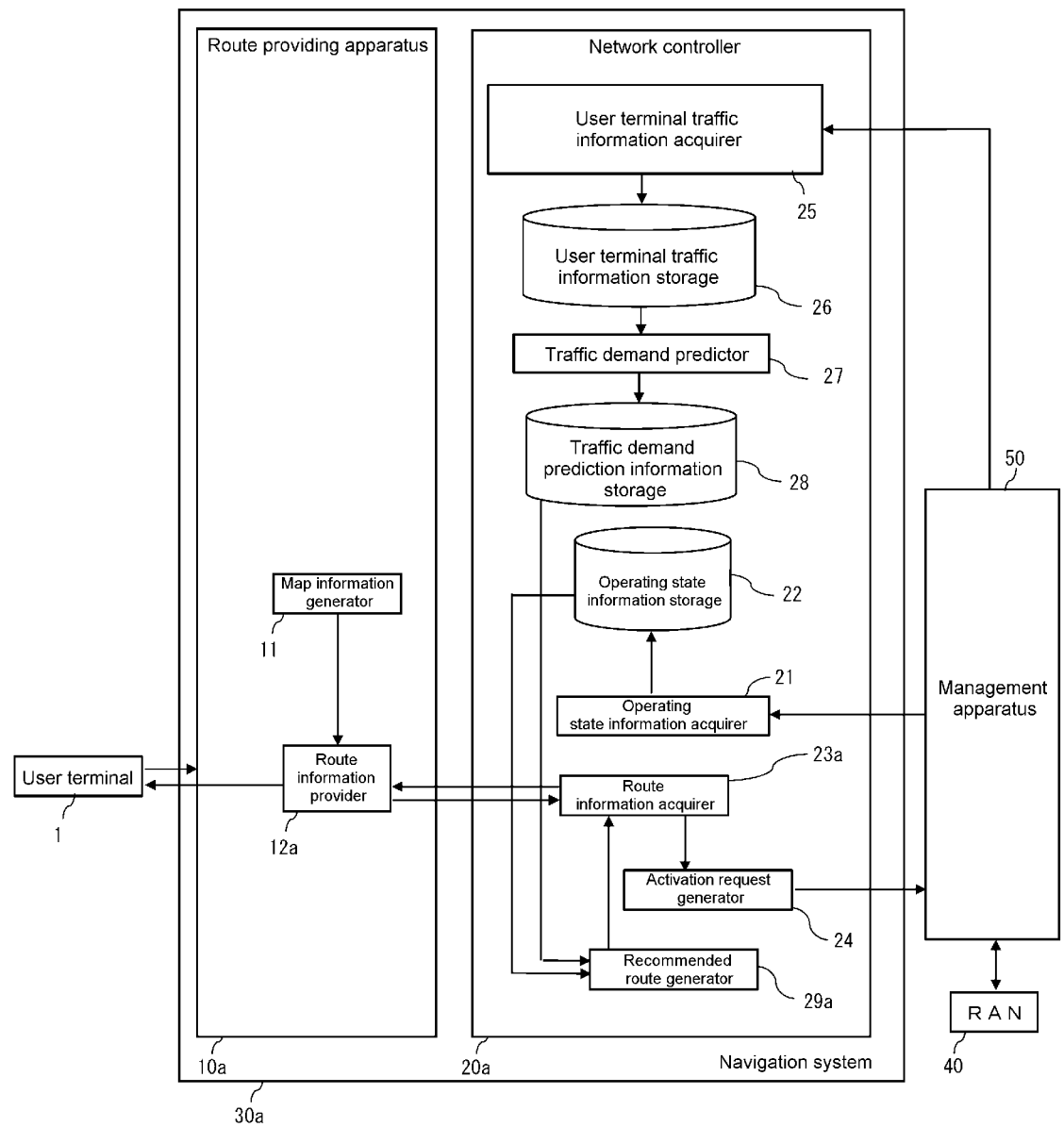
FIG. 7 is a functional block diagram illustrating the configuration of a navigation system and the surroundings thereof in Embodiment 2.

FIG. 7 is a functional block diagram illustrating the configuration of a navigation system 30a and the surroundings thereof in the present embodiment.

In the navigation system 30a illustrated in FIG. 7, the route providing apparatus 10a only differs from the route providing apparatus 10 illustrated in FIG. 2 in that the route providing apparatus 10a comprises a route information provider 12a instead of the route information provider 12.

The route information provider 12a provides one or more recommended routes to the user terminal 1 and sends navigation route information determined in the user terminal 1 to a route information acquirer 23a.

In addition, in the navigation system 30a illustrated in FIG. 7, the network controller 20a only differs from the network controller 20 in that the network controller 20a comprises a recommended route generator 29a instead of the route determiner 29 and the route information acquirer 23a instead of the route information acquirer 23.

The route information acquirer 23a acquires determined navigation route information sent from the route information provider 12a and sends an activation request to the activation request generator 24.

The recommended route generator 29a generates, based on traffic demand prediction information, a recommended route from multiple route candidates.

The recommended route generator 29a can generate a recommended route based on traffic demand predictions regarding the user terminal and/or communication conditions on each route, similar to the route determiner 29 in Embodiment 1.

As one example, when the future traffic demand of the user terminal 1 is predicted to be low, the recommended route generator 29a can determine, from among multiple route candidates, a route with many base stations in an on state corresponding to the areas to be passed through as the recommended route.

As another example, when the future traffic demand of the user terminal 1 is predicted to be high, the recommended route generator 29a can determine, from among multiple route candidates, a route with few user terminals using base stations corresponding to the areas to be passed through as the recommended route.

In this case, whether each individual base station corresponding to each area to be passed through is in an on state or an off state is not taken into consideration.

The recommended route generator 29a may be configured to switch between the two example recommended route generation methods mentioned above depending on whether the future traffic demand of the user terminal 1 is predicted to be low or high.

Figure 8:
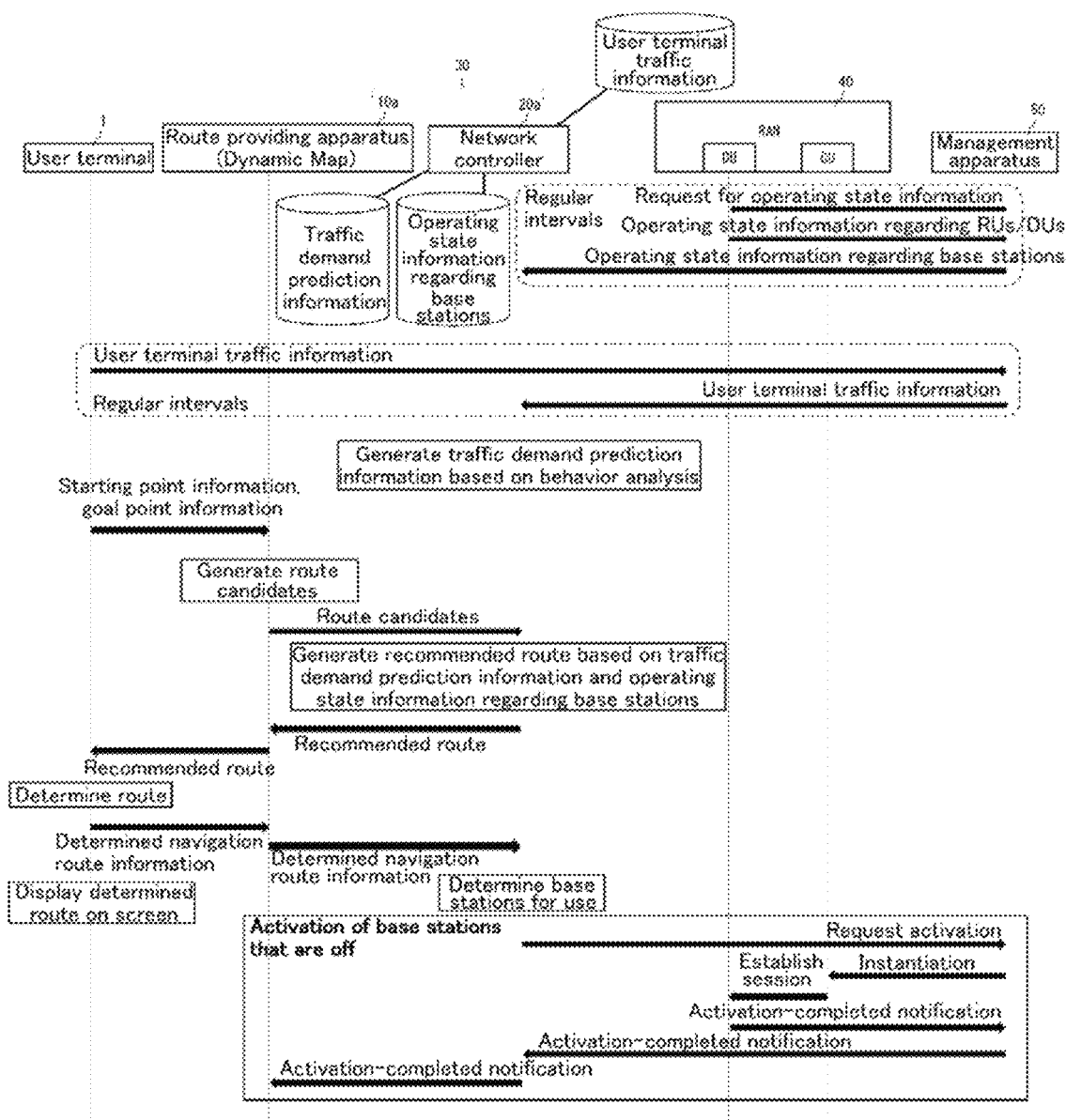
FIG. 8 is a sequence diagram describing the operation of the navigation system in Embodiment 2.

FIG. 8 is a sequence diagram describing the operation of the navigation system 30a according to the present embodiment.

Concerning FIG. 8, only the differences from FIG. 3 will be described below.

The route providing apparatus 10a generates and sends, to the network controller 20a, one or more route candidates based on starting point information and goal point information sent from the user terminal 1 and map information.

Here, when there are multiple route candidates, the network controller 20a generates and sends, to the route providing apparatus 10a, one or more recommended routes based on the traffic demand prediction information.

The route providing apparatus 10a sends one or more recommended routes to the user terminal 1.

In the user terminal 1, a navigation route is determined from the one or more recommended routes.

The user terminal 1 sends determined navigation route information to the route providing apparatus 10a.

The route providing apparatus 10a sends the determined navigation route information to the network controller 20a.

Based on the determined navigation route information, the network controller 20a searches for each base station corresponding to each area through which the determined navigation route passes and determines the base stations for use.

As described above, according to the present embodiment, base stations in an off state that are to perform communication with a user terminal are activated based on the navigation route determined by the user terminal, even when base stations with low communication demand are turned off for energy consumption reduction and leveling used resources, similar to Embodiment 1.

This can enable continuous use of communication services such as route search systems.

Accordingly, it is possible to achieve both continuous use of communication services such as route search systems and energy consumption reduction or leveling used resources.

Even when a route is determined on the user terminal side rather than the network controller, as in the present embodiment, effects similar to those of Embodiment 1 can be obtained.

The present disclosure described above includes the following (1) to (4).

(1) A network controller, comprising one or more processors and memories,
wherein the one or more memories store one or more programs, and
the one or more processors, by reading the one or more programs, realize:
a user terminal traffic information acquirer that acquires user terminal traffic information;
a traffic demand predictor that predicts, based on the user terminal traffic information, future traffic demand and generates traffic demand prediction information;
a route information acquirer that acquires one or more route candidates from a starting point to a goal point;

a route determiner that determines, based on the traffic demand prediction information, a navigation route from the one or more route candidates;

an operating state information acquirer that acquires operating state information regarding a base station; and an activation request generator that generates, based on the operating state information regarding each base station corresponding to each area through which the determined navigation route passes, a request for activating each base station in an off state corresponding to each area through which the determined navigation route passes.

(2) A network controller, comprising one or more processors and memories, wherein the one or more memories store one or more programs, and the one or more processors, by reading the one or more programs, realize:

a user terminal traffic information acquirer that acquires user terminal traffic information;

a traffic demand predictor that predicts, based on the user terminal traffic information, future traffic demand and generates traffic demand prediction information;

a route information acquirer that acquires one or more route candidates from a starting point to a goal point;

a recommended route generator that generates, based on the traffic demand prediction information, one or more recommended routes from the one or more route candidates;

an operating state information acquirer that acquires operating state information regarding a base station; and an activation request generator that generates, based on the operating state information regarding each base station corresponding to each area through which a navigation route determined by being selected from the one or more recommended routes passes, a request for activating each base station in an off state corresponding to each area through which the determined navigation route passes.

(3) The network controller according to (1) or (2), wherein the traffic demand predictor generates a demand prediction model by learning the user terminal traffic information and predicts future traffic demand by estimating a maximum value of a traffic volume based on the demand prediction model.

(4) The network controller according to any of (1) to (3), wherein the activation request generator sends, to an Element Management System (EMS), a request for sequentially activating, from the starting point to the goal point, each base station in an off state corresponding to each area through which the determined navigation route passes.

The present disclosure is not limited to the embodiments discussed above and includes various modified examples in which constituent elements have been added, removed, or replaced with respect to the configurations discussed above.

In addition, the term "connect" used in the present disclosure means a logical connection for communication.

For example, "an RU connected to a DU" means the DU and the RU are logically connected such that communication therebetween is possible.

Accordingly, the DU and the RU may be directly connected physically by a physical cable or the like, but the present disclosure is not limited thereto. Multiple pieces of equipment or radio communication equipment may also be disposed between the DU and the RU.

REFERENCE SIGNS LIST

1 User terminal
2, 102 Starting point
3, 103 Goal point
4 Base stations
   4a First base station
   4b Second base station
   4c Third base station
   4d Fourth base station
   4e Fifth base station
   4f Sixth base station
5 Areas
   5a, 105a First area
   5b, 105b Second area
   5c, 105c Third area
   5d, 105d Fourth area
   5e, 105e Fifth area
   5f Sixth area
6a, 106a First route
6b, 106b Second route
10, 10a Route providing apparatus
   11 Map information generator
   12, 12a Route information provider
   13 Route determiner
   110 Transmission/reception unit
   120 Processing device
      122 Processor
      124 Memory
      126 Storage
20, 20a Network controller
   21 Operating state information acquirer
   22 Operating state information storage
   23, 23a Route information acquirer
   24 Activation request generator
   25 User terminal traffic information acquirer
   26 User terminal traffic information storage
   27 Traffic demand predictor
   28 Traffic demand prediction information storage
   29 Route determiner
   29a Recommended route generator
   210 Transmission/reception unit
   220 Processing device
      222 Processor
      224 Memory
      226 Storage
30, 30a Navigation system
40 RAN
50 Management apparatus

The invention claimed is:

1. A network controller, comprising one or more processors and memories,
wherein
the one or more processors execute a process comprising:
acquiring user terminal traffic information;
predicting, based on the user terminal traffic information, future traffic demand and generating traffic demand prediction information;
acquiring one or more route candidates from a starting point to a goal point;
determining, based on the traffic demand prediction information, a navigation route from the one or more route candidates;

acquiring operating state information regarding a base station, the operating state information comprising information indicating whether the base station is in an on state or an off state; and generating, based on the operating state information regarding each base station corresponding to each area through which the determined navigation route passes, a request for activating each base station in an off state corresponding to each area through which the determined navigation route passes.

2. The network controller according to claim 1, wherein the determining the navigation route comprises:

generating, based on the traffic demand prediction information, one or more recommended routes from the one or more route candidates; and obtaining navigation route information on a determined navigation route selected from the one or more recommended routes.

3. The network controller according to claim 1, wherein the predicting includes:

generates generating a demand prediction model by learning the user terminal traffic information; and predicts predicting future traffic demand by estimating a maximum value of a traffic volume based on the demand prediction model.

4. The network controller according to claim 1, wherein the process further includes, to an Element Management System (EMS), a request for sequentially activating, from the starting point to the goal point, each base station in an off state corresponding to each area through which the determined navigation route passes.

\* \* \* \* \*